US005504516A

United States Patent [19]

Bax

[11] Patent Number: 5,504,516

[45] Date of Patent: Apr. 2, 1996

[54] ELECTRO-OPTICAL HEAD ASSEMBLY

[75] Inventor: Marcel F. Bax, Venlo, Netherlands

[73] Assignee: Oce-Nederland, B.V., Venlo, Netherlands

[21] Appl. No.: 80,125

[22] Filed: Jun. 23, 1993

[30] Foreign Application Priority Data

Jun. 23, 1992 [EP] European Pat. Off. .............. 92201836

[51] Int. Cl.[6] .............................. B41J 2/435; G02B 27/00

[52] U.S. Cl. .............................................. 347/238; 347/241

[58] Field of Search ............................ 346/107 R, 139 R, 346/76 L, 108, 160; 359/820; 385/116, 119; 355/1, 202; 358/296; 347/241, 242, 244, 245, 238, 130, 137, 138

[56] References Cited

U.S. PATENT DOCUMENTS

| | | | |
|---|---|---|---|
| 4,715,682 | 12/1987 | Koek et al. | 359/820 |
| 4,821,051 | 4/1989 | Hediger | 346/155 |
| 4,850,674 | 7/1989 | Hasselskog | 359/820 |
| 5,036,339 | 7/1991 | Hediger | 346/107 R |
| 5,121,146 | 6/1992 | Smith et al. | 346/160 |
| 5,235,348 | 8/1993 | Avonts | 346/107 R |

*Primary Examiner*—Benjamin R. Fuller
*Assistant Examiner*—David Yockey
*Attorney, Agent, or Firm*—Birch, Stewart, Kolasch & Birch

[57] ABSTRACT

An electro-optical head assembly for use in an optical printer or scanner, the electro-optical head assembly including a linear array of electro-optical elements mounted on an elongate support member, a linear lens array held in a rigid lens mount, extending in parallel with the array of electro-optical elements, and means for mounting the lens mount on the support member while maintaining a predetermined distance between the linear array of electro-optical elements and linear lens array over the entire length thereof, the mounting means comprising two elongated plates provided along opposite longitudinal sides of the arrays and having respective first longitudinal edge portions secured to the support member and second longitudinal edge portions, wherein the second longitudinal edge portion of each plate is secured to the lens mount, and each plate is provided with a pattern of holes and/or slots leaving in each plate only a number of separate hinge elements which extend from the first to the second longitudinal edge portion and are flexible in a longitudinal direction of the respective arrays so as to maintain a correct distance between the lens array and the array of electro-optical elements over the entire length of the head assembly, even if a slight axial displacement of the lens mount relative to the support member occurs in the case of uneven thermal expansion.

7 Claims, 3 Drawing Sheets

ELECTRO-OPTICAL HEAD ASSEMBLY

BACKGROUND OF THE INVENTION

1. Field of the Invention

The present invention relates to an optical printer or scanner and, more specifically, to an electro-optical head assembly.

2. Discussion of Related Art

Electro-optical head assemblies are used in optical printers or optical scanners. In case of a printer, the electro-optical elements are usually formed by LED's for outputting the image information of a complete scanning line of an image to be printed, and the lens array comprises a plurality of red lenses or fiber-optical lenses (Selfoc lenses) arranged to focus the light emitted from the LED's onto a scanning line of a photo-sensitive member, such as a photoconductive drum. The number of lens fibers in usually smaller than the number of LED's, so that each fiber transmits the light of a plurality of LED's. Conversely, since the fiber-optical lenses are capable of producing an upright image, a plurality of neighboring lenses can contribute to the image of an individual LED. Accordingly, the positioning of the lenses relative to the LED's in a longitudinal direction of the array is not critical. However, the LED array and the lens array must be held strictly in parallel with each other and the distance between the two arrays must be maintained with high accuracy in order to obtain a good image quality.

Since the LED's dissipate a considerable amount of heat energy, the support member for the LED's is subject to thermal expansion. In view of this problem, U.S. Pat. No. 4,821,051 discloses a printhead of the type described above in which the support member has a heat sink structure and the LED's are mounted on a backing plate which is fixed to the heat sink in a manner to allow for differential thermal expansion of the heat sink and the backing plate. The LED array is composed of a plurality of tiles each carrying a large number of LED's, and the thermal expansion coefficient of the backing plate is matched to that of the tiles.

Support members for supporting the lens mount are provided on both longitudinal ends of the heat sink, and the lens mount, the support members and the heat sink are fixedly held together by screws. In addition, two elongate plate members are disposed between the heat sink and the frame on both sides of the LED array. The lower edge portions of these plate members are fixed on the heat sink with screws, and a gasket type foam material is interposed between the upper edges of the plate members and the lens mount, so that the LED's are contained in a dust-protected enclosure.

If an optical head assembly of this type is to be used for printing or scanning large-size documents, for example with the AO format, the overall length of the head assembly must be made so large that differences in thermal expansion between the lens mount and the support member for the electro-optical elements become significant and may lead to undesired distortions of the assembly. Further, with increasing length of the assembly, it becomes more difficult to provide a sufficient strength of the lens mount to prevent it from bending under its own weight or external forces.

SUMMARY OF THE INVENTION

Therefore, it is an object of the present invention to provide an electro-optical head assembly for an optical printer or scanner which will overcome the above-noted disadvantages.

It is a further object of the present invention to provide a simple and low-cost electro-optical head structure which can readily be assembled to hold an array of electro- optical elements and the lens array, correctly aligned and at a correct mutual distance over their entire lengths, in spite of possible differences in thermal expansion of the lens mount and the support member for the electro-optical array.

The foregoing objects and others are accomplished in accordance with the present invention, generally speaking, by providing an electro-optical head assembly comprising a linear array of electro-optical elements mounted on a elongate support member, a linear lens array held in a rigid lens mount extending in parallel with the array of electro-optical elements, and means for mounting the lens mount on the support member while maintaining a predetermined distance between the respective arrays over the entire length thereof. The means for mounting the lens mount comprises a number of separate hinge elements, connected to both the support member and the lens mount in such a way that a parallelogram construction is defined by which the lens mount is movable relative to the support member in a direction extending parallel to the linear array of electro-optical elements.

The parallelogram construction can be achieved in different ways. One way is to connect both ends of the arrays by means of leaf-springs. Another way is to connect both arrays along their longitudinal sides with arms hingeably connected to the arrays. As a result, the differences in thermal expansion will only lead to a parallel displacement of one or both end portions of the lens mount relative to the support member but not to any bulging or bending thereof.

According to a preferred embodiment of the invention, plates can be provided on both sides of the arrays having hinge holes and/or slots which are so arranged that there remains only a number of separate hinge elements or webs which interconnect the opposite longitudinal edge portions of the plates and are flexible in a longitudinal direction of the arrays. One edge portion of each plate is secured to the support member, and the opposite edge portion is secured to the lens mount. The hinge elements provide a high rigidity of the plates in the direction normal to the longitudinal direction of the arrays, so that the lens mount is prevented from bending toward or away from the support member. Thus, the distance between the lens array and the array of electro-optical elements is held constant over the entire length. On the other hand, the hinge elements can slightly tilt in a longitudinal direction of the arrays and can thus absorb any stresses which may be caused by a difference in thermal expansion of the support member and the lens mount. By using plates, good dust protection is also achieved.

The holes defining the hinge portions of the plates are preferably interconnected by narrow slots which define the hinge element portions. The width of the slots should not be substantially larger than is required for allowing the tilting movements of the hinge elements. In this case, the plates can successfully obstruct the ingress of dust into the hollow space containing the electro-optical elements and the lens surfaces opposed thereto. If desired, the holes and slots may be covered or filled with a plastic or resilient material such as a film bonded onto the surface of the plate.

One end of the lens mount can be rigidly connected to the corresponding end of the support member whereas the other end of the lens mount should be slidingly engaged in a guide member so as to allow for the thermal expansion of the lens mount while maintaining correct alignment of the lens array with the array of electro-optical elements.

In case of a printhead, the support member may be provided with passages for circulating a coolant liquid for absorbing the heat dissipated by the LED's.

BRIEF DESCRIPTION OF THE DRAWINGS

The invention will be further described in conjunction with the following drawings in which.

DETAILED DISCUSSION OF THE INVENTION

Figure 1:
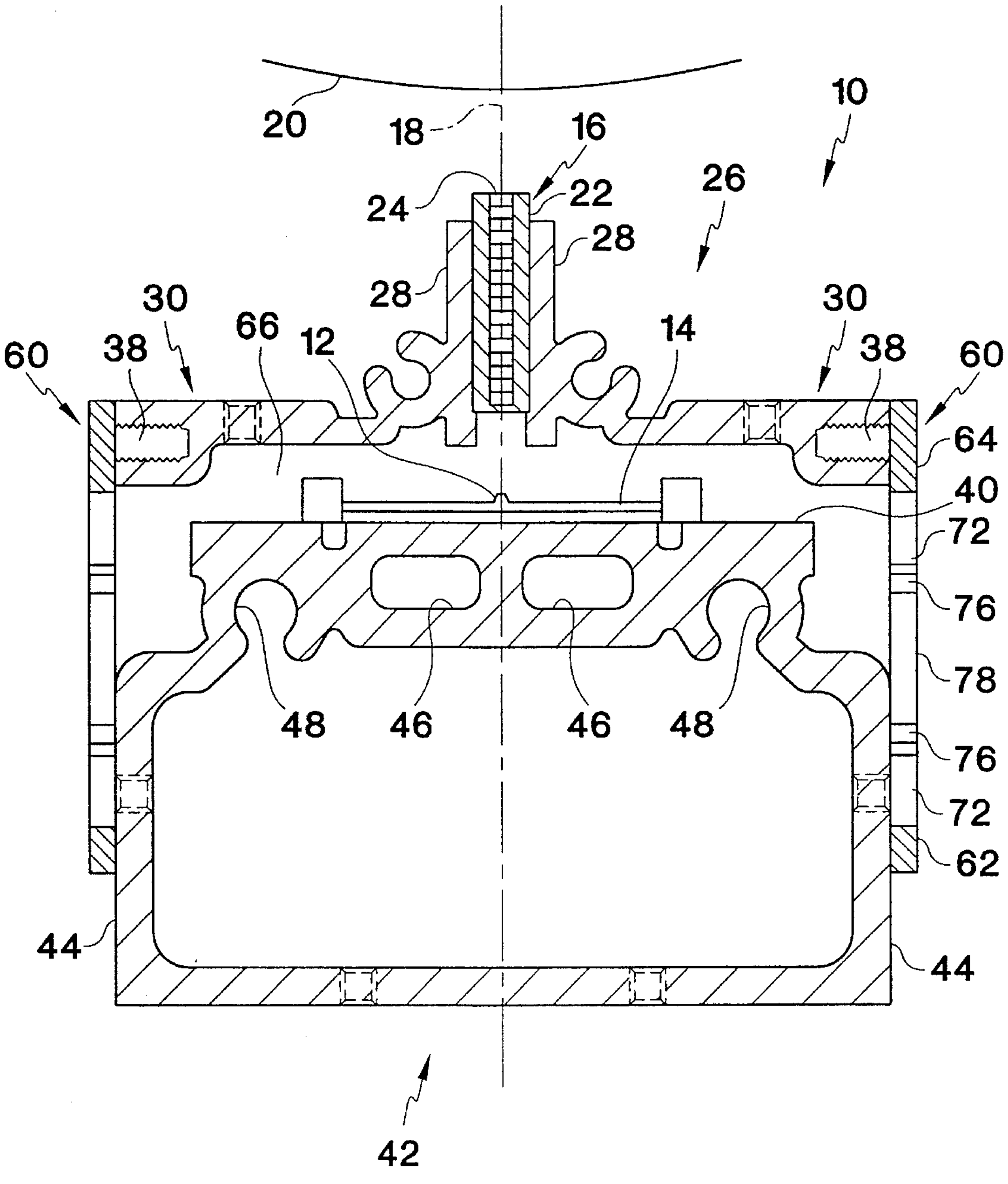
FIG. 1 is a cross-sectional view of an optical printhead comprising a lens mount and a support member for an LED array.
Figure 2:
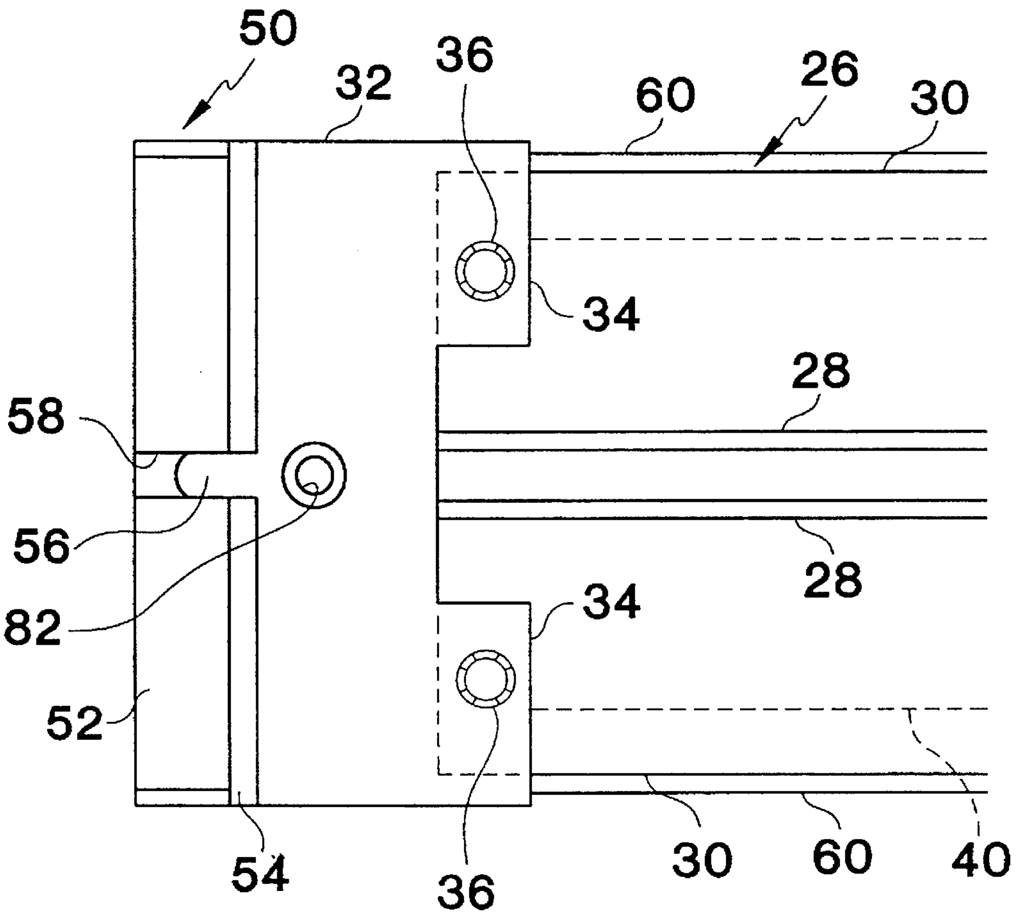
FIG. 2 is a top view of one end portion of the printhead.

An optical printhead 10 which is shown in cross-section in FIG. 1 comprises a linear LED array 12 provided on a circuit board 14 and a lens array 16 aligned with the LED array 12 and disposed at a predetermined distance therefrom so as to focus the light emitted from the LED's onto a focal line 18 on the surface of a photoconductive drum 20. The lens array 16 comprises a body 22 with a bundle of fiber-optical lenses 24 embedded therein. The body 22 is securely held in a lens mount 26 which is generally shaped as a flat plate with two upright flanges 28 for supporting the lateral faces of the lens array 16. The lens mount 26 is formed by two extruded aluminum profiles 30 which are interconnected at both ends by end pieces 32, one of which is shown in FIG. 2. Each end piece 32 is fittingly engaged with two end portions of the aluminum profiles 30 and has a portion 34 which overlaps with the profiles 30 and is fixed thereto by screws 36.

As is shown in FIG. 1, the lens mount 26 has a comparatively large width and has therefore a sufficient rigidity to prevent the lens array 16 from flexing laterally. The lateral edges of the lens mount 26 have an increased thickness and are provided with longitudinal grooves or screw holes for fastening screws 38.

The circuit board 14 carrying the LED array 12 is securely fixed to a table-like mounting platform 40 on the top side of a support member 42. The support member 42 is an extruded hollow profile made of the same material as the profiles 30, i.e. of aluminum, and has a substantially rectangular cross section forming lateral outer surfaces 44 which are flush with the lateral edge surfaces of the lens mount 26. The mounting platform 40 is internally provided with two longitudinal passages 46 through which a coolant liquid can be circulated for dissipating the heat generated by the LED array 12. The mounting table 40 is further provided with two screw channels 48 which are used for securing an end block 50 to each longitudinal end of the support member 42.

One of the end blocks 50 is shown in FIG. 2. This end block comprises an upwardly projecting flange 52 which forms a narrow gap 54 with the outer end face of the end piece 32. An axial projection 56 of the end piece 32 is slidingly engaged in a groove 58 formed in the flange 52. Thus, the end piece 32 which is fixedly secured to the lens mount 26 is allowed to move axially relative to the support member 42 and the end block 50, while the engagement of the projection 56 in the groove 58 assures a correct alignment between the LED array 12 and the lens array 16.

As is shown in FIG. 1, the support member 42 and the lens mount 26 are held together by two sheet metal plates 60. The lower edge portions 62 of the plates 60 are screwed to the respective side surfaces 44 of the support member 42, and the upper edge portions 64 of the plates are secured to the lateral edges of the lens mount 26 by means of ,the fastening screws 38. Together with the support member 42, the lens mount 26, the end pieces 32 and end blocks 50, the plates 60 define a substantially dust-proof enclosed space 66 which contains the LED array 12 and the lower end faces of the fiber-optical lenses 24.

Figure 3:
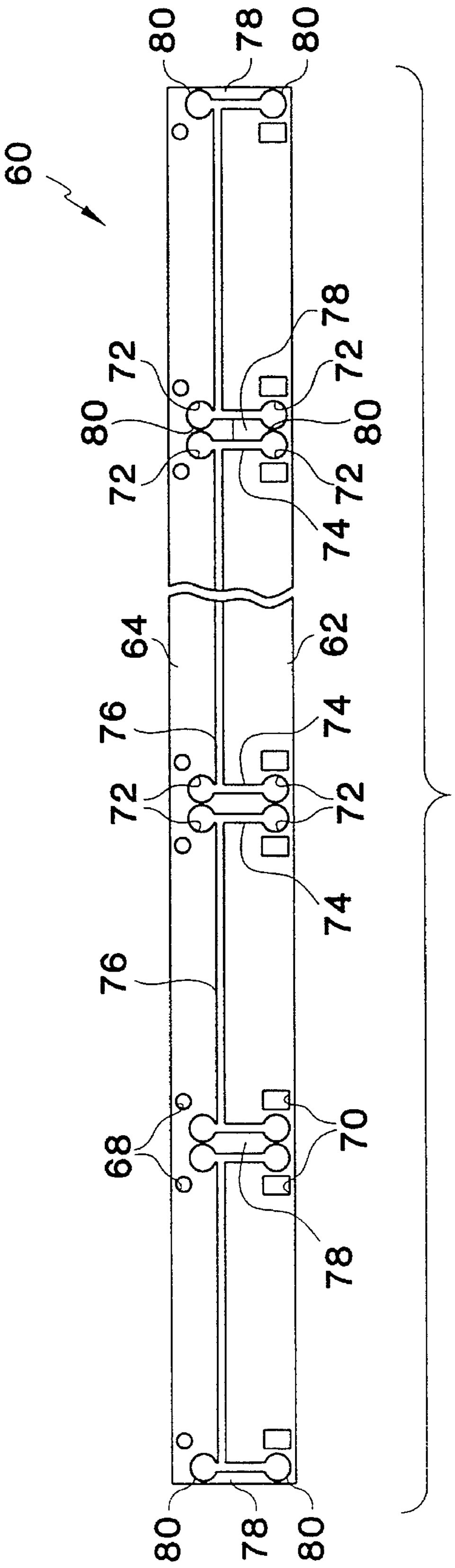
FIG. 3 is a side view of a plate for connecting the lens mount to the support member.

An individual plate 60 is shown in FIG. 3. The upper edge portion 64 of the plate is provided with holes 68 for the fastening screws 38, and the lower edge portion 62 is provided with vertically elongated holes 70 which serve for fixing the plate 60 to the side face 44 of the support member 42 at an adjustable height. In addition, the plate 60 is formed with a pattern of holes 72 and slots 74 and 76. The holes 72 are arranged in pairs near the lower edge portion 62 and upper edge portion 64 of the plate 60, and the holes of each pair are interconnected by a vertical slot 74. The vertical slots 74 are interconnected in pairs by horizontal slots 76, so that a plurality of H-shaped slot structures are formed. The vertical slots 74 of the individual H-shaped structures are closely juxtaposed to one another and define a web 78 which interconnects the upper and lower edge portions 62 and 64 of the plate. At the upper and lower ends of each web, the holes 72 leave only a small hinge portion 80 in which the width is reduced to such an extent that the hinge portion is resilient due to the elasticity of the sheet metal forming the plate 60. Similar webs 78 and hinge portions 80 are formed at both longitudinal ends of the plate 60. The webs 78 are thus capable of tilting about the hinge portions formed at their upper and lower ends, so that a parallel displacement of the upper and lower edge portions 64 and 62 of the plate 60 relative to one another is possible, whereas the vertical distance between these edge portions remains substantially constant. Such a parallel displacement of the upper and lower edge portions may be caused by a difference in thermal expansion of the support member 42 and the lens mount 26.

For example, the heat dissipated by the LED array 12 is only partly removed by the coolant liquid circulating through the passages 46, so that the support member 42 may be heated to a temperature which is approximately 30° C. higher than the temperature of the lens mount 26. If it is assumed that the length of the optical printhead 10 is approximately 1 m, the differences in thermal expansion accumulated over the whole length of the printhead result in a relative longitudinal displacement of the end portions of the support member 42 and the lens mount 26 of approximately 700 μm. When the vertical length of the web portions 78 is in the order of 2 cm, the relative axial displacement corresponds to a tilting angle of the webs 78 in the order of 1°. The change in the vertical distance between the LED array 12 and the lens array 16 is negligible for such small tilting angles. The vertical slots 74 in the plates 60 and the gap 54 between the end piece 32 and the flange 52 are so dimensioned that they permit a sufficient tilting movement and relative displacement, respectively. Due to this construction, the differences in thermal expansion can be compensated without causing the lens mount 26 and the lens array 16 to bend in the vertical direction.

As is shown in FIG. 2, each end piece 32 is provided with a vertical bore 82 which permits the insertion of adjusting means for adjusting the vertical distance between the lens mount 26 and the support member 42 during assembly of the printhead. Once the proper vertical distance has been adjusted, the plates 60, which have previously been mounted to the lens mount 26, are firmly secured to the support member 42, and then the adjusting means removed so that they may not obstruct the relative longitudinal displacement of the end portions of the support member and the lens mount.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electro-optical head assembly for use in an optical printer or scanner, comprising:

a linear array of electro-optical elements mounted on an elongate support member, a linear lens array held in a rigid lens mount, extending in parallel with said linear array of electro-optical elements, and means for mounting said lens mount to said elongate support member lateral to opposite longitudinal sides of said linear array of electro-optical elements, wherein said mounting means comprises two elongated plates each having a respective first longitudinal edge portion secured to said elongate support member and a second longitudinal edge portion secured to said lens mount, each of said plates being provided with a pattern of holes and slots forming a plurality of separate hinge elements which extend from said first longitudinal edge portion secured to said elongate support member to said second longitudinal edge portion secured to said lens mount such that a parallelogram construction is configured by which said lens mount is movable relative to said elongate support member in a direction extending parallel to said linear array of electro-optical elements.

2. An electro-optical head assembly according to claim 1, wherein hinge portions of each of said hinge elements are defined between a pair of holes in said first longitudinal edge portion and a pair of holes in said second edge portion said holes being joined by slots interconnecting said holes in said first longitudinal edge portion and second longitudinal edge portion, with said slots being interconnected by a discontinuous longitudinal slot.

3. An electro-optical head assembly according to claim 1, wherein lateral edges of said lens mount are flush with side surfaces of said elongate support member, and said elongated plates are fixed to said lateral edges of said lens mount and said side surfaces of said elongate support member.

4. An electro-optical head assembly according to claim 1, further including means for securing said elongated plates to said elongate support member at variable heights, and means for temporarily mounting an adjusting means for adjusting said heights of said lens mount relative to said elongate support member.

5. An electro-optical head assembly according to claim 1, wherein at least one end portion of said lens mount is slidably engaged with a guide means for permitting an axial displacement of said at least one end portion while preventing lateral displacement thereof.

6. An electro-optical head assembly according to claim 1, wherein said holes and slots in said elongated plates are covered by a resilient material, and said assembly further comprises a substantially dustproof enclosure for said array of electro-optical elements including said elongate support member and said lens mount.

7. An electro-optical head assembly according to claim 1, wherein said elongate support member is metal and is internally provided with passages for circulating a coolant liquid therethrough.

* * * * *